(12) United States Patent
Xu

(10) Patent No.: US 9,079,803 B2
(45) Date of Patent: Jul. 14, 2015

(54) ADDITIVE MANUFACTURING HYBRID CORE

(75) Inventor: JinQuan Xu, Groton, CT (US)

(73) Assignee: UNITED TECHNOLOGIES CORPORATION, Hartford, CT (US)

( * ) Notice: Subject to any disclaimer, the term of this patent is extended or adjusted under 35 U.S.C. 154(b) by 165 days.

(21) Appl. No.: 13/440,429

(22) Filed: Apr. 5, 2012

(65) Prior Publication Data

US 2013/0266816 A1    Oct. 10, 2013

(51) Int. Cl.
| | |
|---|---|
| *B22F 7/06* | (2006.01) |
| *C04B 35/64* | (2006.01) |
| *B22F 3/105* | (2006.01) |
| *C22C 1/04* | (2006.01) |
| *B22C 9/10* | (2006.01) |

(52) U.S. Cl.
CPC ............... *C04B 35/64* (2013.01); *B22F 3/1055* (2013.01); *B22F 7/06* (2013.01); *B22C 9/10* (2013.01); *B22F 2003/1058* (2013.01); *C04B 2235/6026* (2013.01); *C22C 1/045* (2013.01)

(58) Field of Classification Search
CPC .................................................... B22F 3/1055
USPC ............................................................ 419/6
See application file for complete search history.

(56) References Cited

U.S. PATENT DOCUMENTS

| | | | |
|---|---|---|---|
| 5,076,869 A | 12/1991 | Bourell et al. | |
| 5,182,170 A * | 1/1993 | Marcus et al. | ................ 264/497 |
| 5,900,207 A * | 5/1999 | Danforth et al. | .............. 264/603 |
| 6,117,612 A * | 9/2000 | Halloran et al. | .............. 430/269 |
| 6,637,500 B2 | 10/2003 | Shah et al. | |
| 6,793,140 B2 * | 9/2004 | Mazumder | .................... 235/487 |
| 6,929,054 B2 | 8/2005 | Beals et al. | |
| 7,270,170 B2 * | 9/2007 | Beals et al. | .................. 164/132 |
| 7,270,173 B2 * | 9/2007 | Wiedemer et al. | ............ 164/369 |
| 7,461,684 B2 * | 12/2008 | Liu et al. | ......................... 164/97 |
| 7,509,738 B2 * | 3/2009 | Adams et al. | .............. 29/890.01 |
| 7,651,658 B2 | 1/2010 | Aimone et al. | |
| 7,861,766 B2 | 1/2011 | Bochiechio et al. | |
| 2006/0239819 A1 * | 10/2006 | Albert et al. | ................ 416/97 R |
| 2011/0097213 A1 | 4/2011 | Peretti et al. | |
| 2011/0311389 A1 | 12/2011 | Ryan et al. | |
| 2013/0026338 A1 * | 1/2013 | Castle et al. | ............... 249/114.1 |

OTHER PUBLICATIONS

International Search Report for PCT Application No. PCT/US2013/035240 mailed Feb. 7, 2014.
International Preliminary Report on Patentability for PCT Application No. PCT/US2013/035240, mailed Oct. 16, 2014.

* cited by examiner

*Primary Examiner* — George Wyszomierski
*Assistant Examiner* — Ngoclan T Mai
(74) *Attorney, Agent, or Firm* — Carlson, Gaskey & Olds

(57) ABSTRACT

A hybrid core for manufacturing high temperature parts includes a non-refractory metal portion and a refractory metal portion wherein at least a portion of the non-refractory metal portion and the refractory metal portion are manufactured by using an additive manufacturing process.

12 Claims, 3 Drawing Sheets

ADDITIVE MANUFACTURING HYBRID CORE

TECHNICAL FIELD

This invention relates to the creation of super alloy turbine engine components and more particularly by creating core assemblies using additive manufacturing.

BACKGROUND OF THE INVENTION

Investment casting is a commonly used technique for forming metallic components having complex geometries, especially hollow components, and is used in the fabrication of super alloy gas turbine engine components.

Gas turbine engines are widely used in aircraft propulsion, electric power generation, and ship propulsion. In gas turbine engine applications, efficiency is a prime objective.

Improved gas turbine engine efficiency can be obtained by operating at higher temperature, however current operating temperatures in the turbine section exceed the melting points of the super alloy materials used in turbine components. Consequently, it is a general practice to provide air cooling. Cooling is provided by flowing relatively cool air from the compressor section of the engine through passages in the turbine components to be cooled. Such cooling comes with an associated cost in engine efficiency. Consequently, there is a strong desire to provide enhanced specific cooling, maximizing the amount of cooling benefit obtained from a given amount of cooling air. This may be obtained by the use of fine, precisely located, cooling passageway sections.

The ceramic cores themselves may be formed by molding a mixture of ceramic powder and binder material by injecting the mixture into dies. After removal from the dies, the green cores are thermally post-processed to remove the binder and fired to sinter the ceramic powder together. The trend toward finer cooling features has taxed core manufacturing techniques. The fine features may be difficult to manufacture and/or, once manufactured, may prove fragile.

One known process includes forming one or more refractory metal cores (RMCs) that includes a combination of cutting (e.g., laser cutting or stamping) from a refractory metal sheet (e.g., molybdenum or niobium), forming/shaping (e.g., the stamping or other bending), and coating with a protective coating. The RMC(s) are then transferred to a die where a ceramic material (e.g., silica-, zircon-, or alumina-based) is formed over a portion of the RMC(s) to form an initial combination (core assembly). The as-molded ceramic material may include a binder. The binder may function to maintain integrity of the molded ceramic material in an unfired green state. The combination may be then transferred to a heating chamber (e.g., kiln or furnace) for further processing.

Conventional ceramic cores are produced by a molding process using ceramic slurry and a shaped die; both injection molding and transfer-molding techniques may be employed. The pattern material is most commonly wax although plastics, low melting-point metals, and organic compounds such as urea, have also been employed. The shell mold is formed using a colloidal silica binder to bind together ceramic particles which may be alumina, silica, zirconia and alumina silicates.

The investment casting process to produce a turbine blade includes using a ceramic core having geometry desired for the internal cooling passages for the blade is placed in a metal die whose walls surround but are generally spaced away from the core. The die is filled with a disposable pattern material such as wax. The die is removed leaving the ceramic core embedded in a wax pattern. The outer shell mold is then formed about the wax pattern by dipping the pattern in ceramic slurry and then applying larger, dry ceramic particles to the slurry. This process is termed stuccoing. The stuccoed wax pattern, containing the core, is then dried and the stuccoing process repeated to provide the desired shell mold wall thickness. At this point the mold is thoroughly dried and heated to an elevated temperature to remove the wax material and strengthen the ceramic material.

The result is a ceramic mold that contains a ceramic core that defines a mold cavity. It will be understood that the exterior of the core defines the passageway to be formed in the casting and the interior of the shell mold defines the external dimensions of the super alloy casting to be made. The core and shell may also define casting portions such as gates and risers which are necessary for the casting process but are not a part of the finished cast component.

After the removal of the wax, molten super alloy material is poured into the cavity defined by the shell mold and core assembly and solidified. The mold and core are then removed from the super alloy casting by a combination of mechanical and chemical means.

As previously noted, the currently used ceramic cores limit casting designs because of their fragility and because cores with dimensions of less than about 0.012-0.015 inches (0.305-0.381 mm) cannot currently be produced with acceptable casting yields.

SUMMARY

According to an embodiment described herein, a hybrid core for manufacturing high temperature parts includes a non-refractory portion and a refractory metal portion wherein at least a portion of the non-refractory portion and the refractory metal portion are manufactured using additive manufacturing process.

In any of the previous embodiments, at least a portion of the refractory metal portion is manufactured by using refractory metal powder during an additive manufacturing process.

In any of the previous embodiments, at least a portion of the non-refractory portion is manufactured by using non-refractory powder during an additive manufacturing process.

In any of the previous embodiments, at least a portion of the refractory metal portion is manufactured by using refractory metal powder during an additive manufacturing process and the non-refractory portion is manufactured by using non-refractory powder during an additive manufacturing process.

In any of the previous embodiments, the at least a portion of the refractory metal portion and the non-refractory portion are attached to each other.

In any of the previous embodiments, one of the non-refractory portion and the refractory metal portion have an interface for receiving an other of the non-refractory portion and the refractory metal portion.

In any of the previous embodiments, one of the non-refractory portion and the refractory metal portion are formed on top of an other of the non-refractory portion and the refractory metal portion.

In any of the previous embodiments, one of the a non-refractory portion and the refractory metal portion are formed adjacent an other of the non-refractory portion and the refractory metal portion.

In any of the previous embodiments, the non-refractory metal portion is a ceramic material According to an exemplary method disclosed herein for manufacturing a hybrid core for high temperature parts, the steps include providing a non-refractory portion; providing a refractory metal portion; and manufacturing at least a portion of the non-refractory portion and the refractory metal portion by using additive manufacturing process.

In any of the previous embodiments, the method includes providing refractory metal powder, and manufacturing at least a portion of the refractory metal portion by fusing the refractory metal powder into a shape layer by layer.

In any of the previous embodiments, the method includes providing non-refractory powder, and manufacturing at least a portion of the non-refractory portion by fusing the non-refractory powder into a shape layer by layer.

In any of the previous embodiments, the method includes providing refractory metal powder, manufacturing at least a portion of the refractory metal portion by fusing the refractory metal powder into a shape layer by layer, providing non-refractory powder, and manufacturing at least a portion of the non-refractory portion by fusing the non-refractory powder into a shape layer by layer.

In any of the previous embodiments, the manufacturing steps are concurrent.

In any of the previous embodiments, the wherein the manufacturing steps are not concurrent.

In any of the previous embodiments, the method includes interfacing one of the non-refractory portion and the refractory metal portion with an other of the non-refractory portion and the refractory metal portion.

In any of the previous embodiments, the method includes mixing the non-refractory metal powder with a binder.

In any of the previous embodiments, the method includes manufacturing one of the non-refractory portion and the refractory metal portion on top of an other of the non-refractory portion and the refractory metal portion.

In any of the previous embodiments, the method includes manufacturing one of the non-refractory portion and the refractory metal portion adjacent an other of the non-refractory portion and the refractory metal portion.

According to a further exemplary hybrid core disclosed herein, a hybrid core for manufacturing for turbine engine parts includes a first portion made of a non-refractory metal portion and a second portion made of a refractory metal portion or a non-refractory metal portion wherein at least one of the first portion or the second portion is manufactured using additive manufacturing process.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numbers and designations in the various drawings indicate like elements.

DETAILED DESCRIPTION

The Applicant has discovered that the prior art manufacture of refractory metal cores (RMC) that typically utilizes sheets of refractory metal may not be fine enough to create the intricate cooling channeling and efficiency required as a quest for maximizing efficiency of the cooling of gas turbine engine components continues to be developed. Other techniques are required.

Referring now to FIGS. 1-4, portions of hybrid cores 10 are shown. The hybrid cores 10 are for use in manufacturing components of a gas turbine engine (not shown) or other engine (not shown) requiring very high temperatures for operation. The cores 10 include a refractory metal portion (RMC portion) 15A-D and a non-refractory metal portion, for example, a ceramic portion 20A-D. The RMC portions 15A-D and the ceramic portions 20A-D may be used in the normal processing of ceramics and RMC as are known in the art to create super alloy turbine engine components (not shown) or other components (not shown) that require cooling at very high temperatures. RMC portions 20 can be used to form a very small diameter cooling passages and cooling holes that could not be feasibly formed by casting using conventional core technology within the wall of the super alloy turbine engine components, for example an airfoil.

Figure 1:
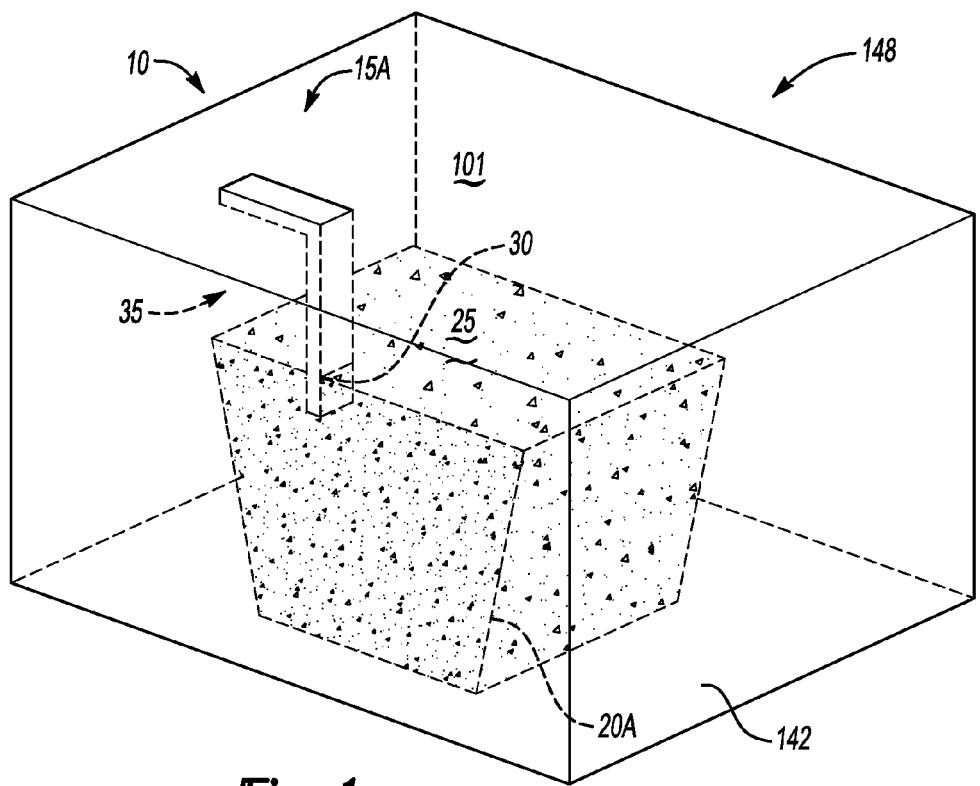
FIG. 1 is a first embodiment of a portion of a hybrid core assembly.

Referring to FIG. 1, the ceramic portion 20A exists and an RMC portion 15A is additively manufactured on a top 25 of the ceramic portion 20A. The RMC portion 15A may also be adjacent but contacting the ceramic portion 20A. The ceramic portion 20A may have a receiving feature such as a groove 30 therein for receiving the RMC portion 15A. An angular shape 35 of the RMC portion 15A may be any shape as may be required for cooling within a turbine airfoil (not shown) or the like. Similarly, the ceramic portion 20A may be any desired shape.

Figure 2:
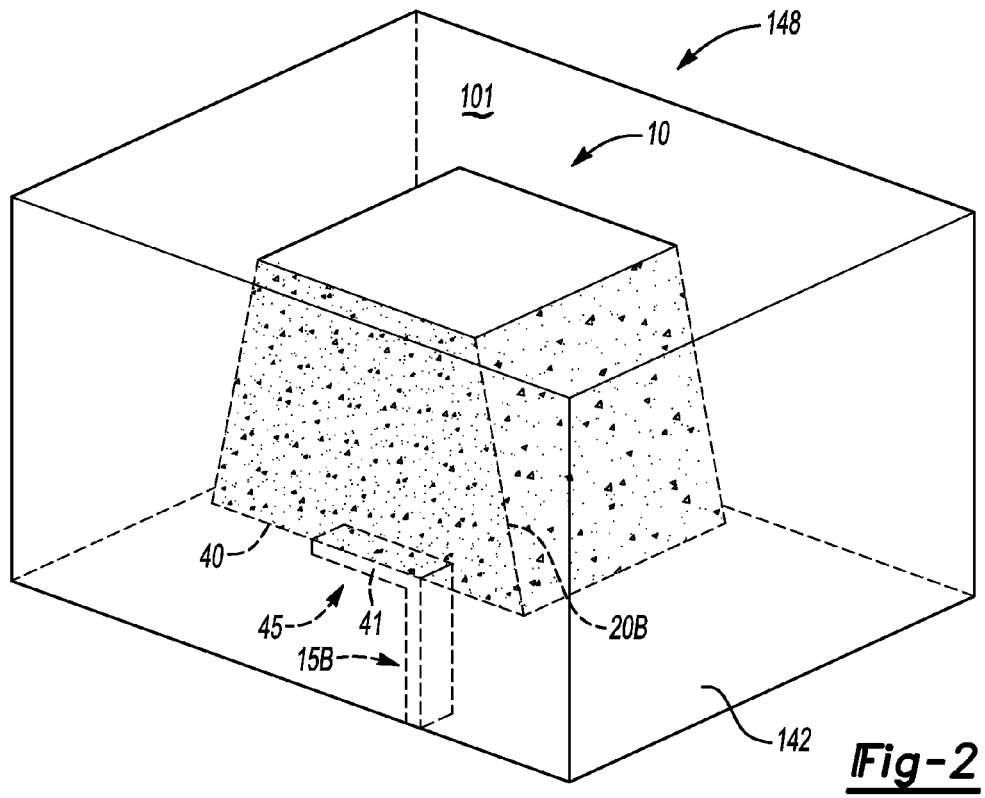
FIG. 2 is a second embodiment of a portion of a hybrid core assembly.

Referring to FIG. 2, the RMC portion 15B exists and the ceramic portion 20B is additively manufactured on a top 40 of the RMC portion 15B. The RMC portion 15B may also be adjacent but contacting the ceramic portion 20B. The RMC portion 15B has an elongated portion 41 in contact or overlapping with the ceramic portion 20B to enhance the structural integrity of the connected RMC portion 15B the ceramic portion 20B. As with the RMC portion 15A in FIG. 1, the angular shape 45 of the RMC portion 15B may be any shape as may be required for cooling within a turbine airfoil (not shown) or the like. Similarly, the ceramic portion 20B may be any desired shape.

Figure 3:
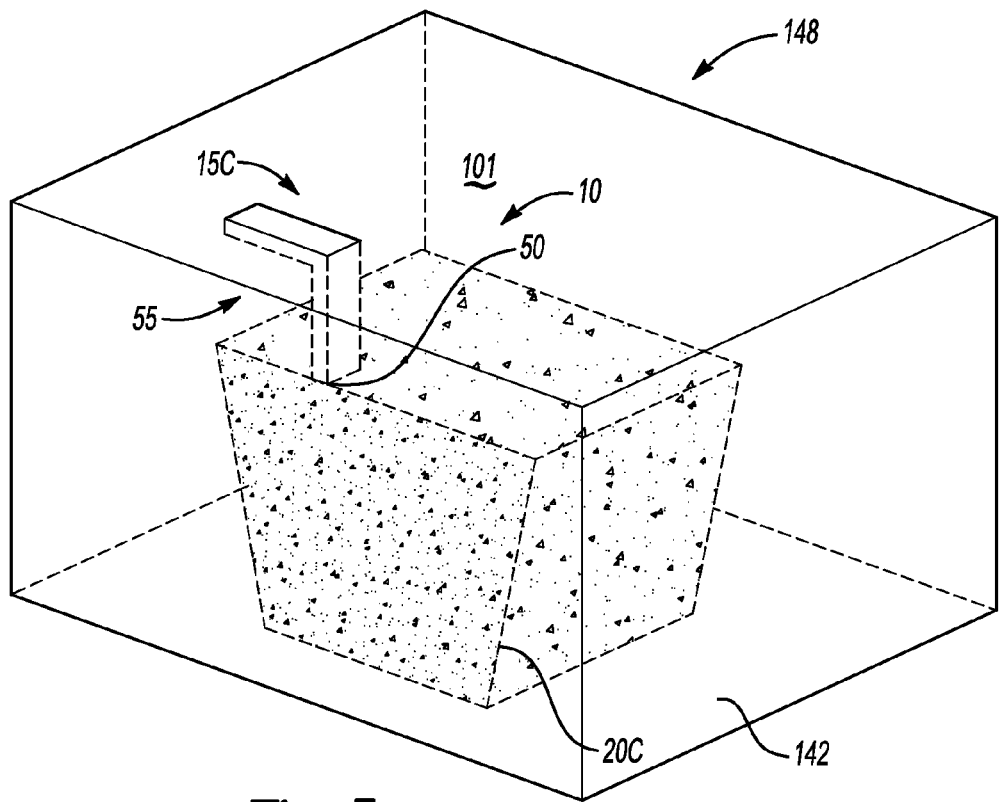
FIG. 3 is a third embodiment of a portion of a hybrid core assembly.

Referring to FIG. 3, neither of a ceramic portion 20C and an RMC portion 15C exists. Both of the ceramic portion 20C and an RMC portion 15C are additively manufactured to form one piece. The RMC portion 15C may be deposited adjacent but contacting the ceramic portion 20C. As with the embodiments shown in FIGS. 1 and 2, the ceramic portion 20C may have a groove 50 therein for receiving the RMC portion 15C or vice-versa; or the RMC portion has an elongated portion in contact or overlapping with the ceramic portion to enhance the structural integrity of the connected RMC portion and the ceramic portion. An angular shape 55 of the RMC portion 15C may be any shape as may be required for cooling within a turbine airfoil (not shown) or the like. Similarly, the ceramic portion 20C may be any desired shape.

Figure 4:
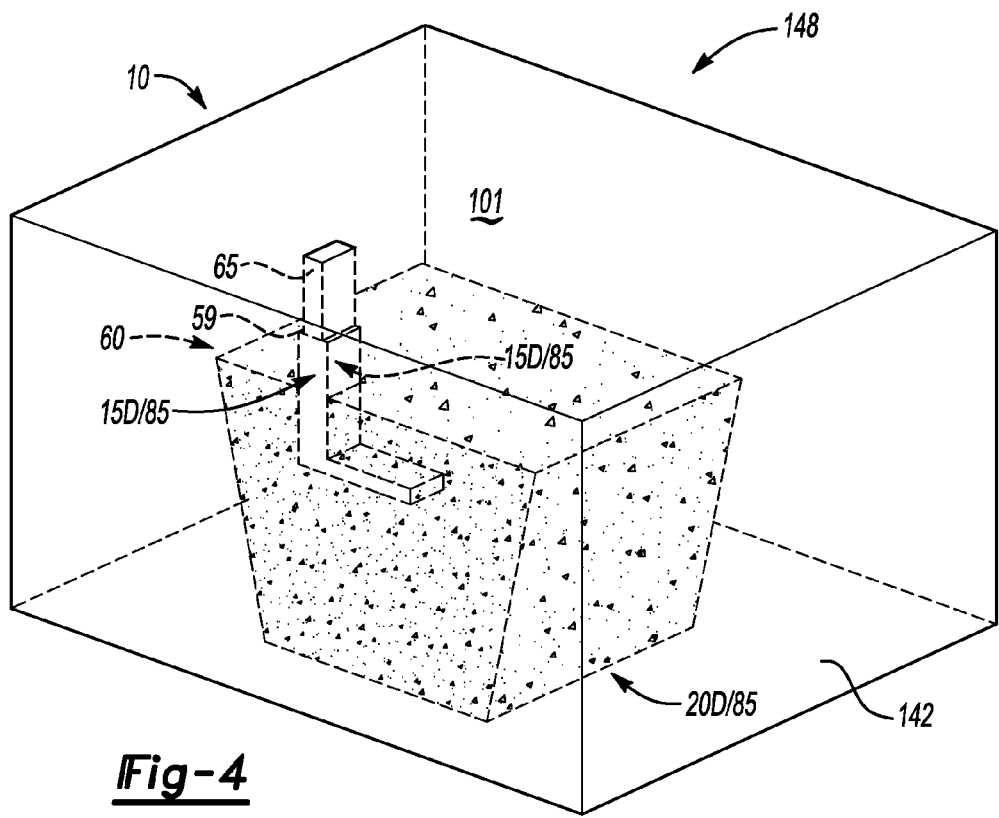
FIG. 4 is a fourth embodiment of a portion of a hybrid core assembly.

Referring to FIG. 4, the ceramic portion 20D exists (or any portion 85 manufactured by another process) that includes an extension 60 that may include an RMC portion 15D (or any other portion 85 manufactured from the teachings herein), and a piece 65 of the RMC portion 15D (the piece 65 may be another refractory metal material) is additively manufactured on a top 59 of, or adjacent but contacting, the ceramic portion 20D. The shapes of the ceramic portion 20D, the extension 60 and the RMC portion 15D may be any shape as may be required for cooling within a turbine airfoil (not shown) or the like.

Figure 5:
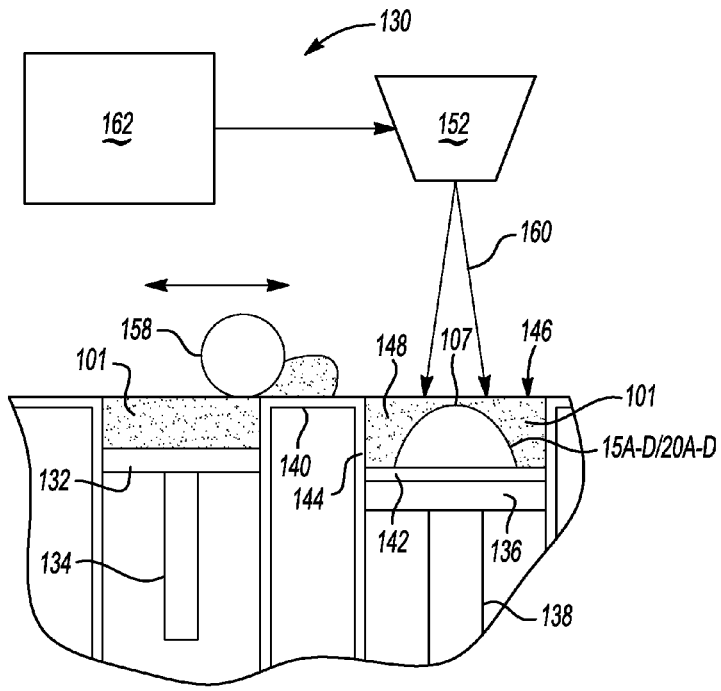
FIG. 5 shows a schematic view of a mechanism for creating the embodiments shown in FIGS. 1-4.

Referring to FIG. 5, a method of forming the embodiments shown in FIGS. 1-4 is shown. A direct metal manufacturing tool 130 has a first platform 132 attached to first piston 134 and second platform 136 attached to second piston 138. Build-up material, such as powder 101 is pre-disposed on second platform 136. A distribution tool 158, such as a roller, is vertically aligned with the top of wall 140 and distributes a layer of powder 101 over wall 140 onto a base 142 arranged on first platform 132. The distribution tool 158 may move across the entire first platform 132 and second platform 134 to evenly distribute powder 101 on base 142. The distribution tool 158 then moves back to the first platform 132.

The wall 140, base 142, and side walls 144 form a cavity 146 to hold a bed 148 of powder 101. A beam source 152 heats predetermined portions of the powder 101 in the cavity 146 to form a cross-sectional layer of the embodiments shown in FIGS. 1-4.

After the cross-sectional layer 107 is formed, second piston 138 moves second platform 136 and base 142 downwards while first piston 134 moves first platform 132 and supply of powder 101 upwards such that another portion of the powder 101 is disposed above wall 140. The distribution tool 158 can then move more powder 101 into cavity 146 and onto the base 142 on the second platform 136 to begin the steps of forming another layer of the RMC portions or the ceramic portions of the hybrid core 10. By arranging the second platform 136 and base 142 level or below the first platform 132, the distribution tool 158 is able to continuously add additional powder 101 to the already present powder 101 in the cavity 146 such that powder 101 in the cavity 146 forms the layers of the RMC portions 15A-D or the ceramic portions 20A-D through melting or sintering (e.g., fusing) by the beam source 152.

In this example, the beam source 152 includes a laser, lenses, and a scanning mirror (not shown and as known in the art). However, other arrangements of beam sources 152, such as an electron beam or the like may be used. The beam source provides a laser 160 which is magnified by the lenses and redirected by the scanning mirror to contact a pre-determined portion of the powder 101 anywhere in the cavity 94 corresponding to a layer of the RMC portions 15A-D or the ceramic portions 20A-D. The laser 160 heats the powder 101 to melt or sinter the powder 101, forming each layer of the RMC portions 15A-D or the ceramic portions 20A-D. In one example, the laser 160 heats the powder 101 in the cavity 146 at a temperature in the range of 2300° F. to 2440° F. (1260° C.-1338° C.). However, one of ordinary skill in the art will recognize that other temperatures may be used depending on the materials used for the powder 101.

A 3D CAD model of embodiments shown in FIGS. 1-4 may be created and placed in a controller 162 for the tool 130. The controller 162, with assistance from a user, creates a build file that has the part properly oriented to make RMC portions 15A-D or the ceramic portions 20A-D in the tool and then the controller instructs the tool 130 to create the RMC portions 15A-D or the ceramic portions 20A-D. In accordance with a build file instruction set (not shown), the controller instructs the tool to take cross-sections of the desired embodiments shown in FIGS. 1-4 and builds the part from the bottom up, one cross-section at a time by directing the laser 160 at areas to be solidified in each cross-section. While a cross-section solidifies, the controller instructs the first piston 134 to rise a certain distance depending on the thickness of the next cross-section and the second piston 138 to fall a corresponding distance. The distribution tool 158 then spreads the amount of powder 101 above the wall 140 across the wall 140 across the bed 148 augmenting its height and the laser then is activated to form another cross-section of an embodiment shown in FIGS. 1-4. The cross-sections are spaced from each other generally by the thickness of the mass of powder 101 caused by the heat of the laser 160. This distance may vary upon the type of material used. The powder 101 may be, for instance, a ceramic, or if an RMC, refractory metals such as tungsten, molybdenum, tantalum, rhenium, niobium etc. or combinations thereof may be used. Because the cross-sections are close to each other, e.g., about 10 micrometers or less, the intricate details are easily achievable relative to other methodologies.

Figure 6:
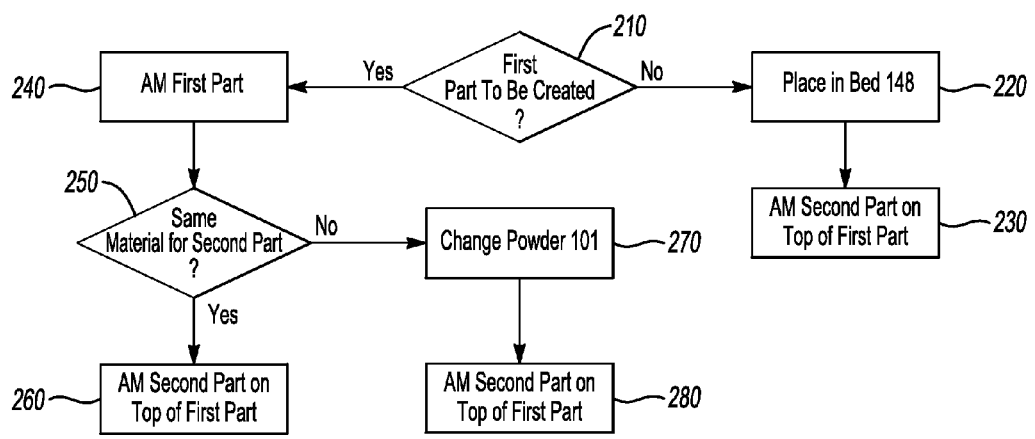
FIG. 6 shows a block diagram of a method to create the hybrid core assemblies of FIGS. 1-4.

Referring now to FIG. 6 a general method of forming hybrid parts is shown. A first part (e.g., 15A) is provided or is to be created (step 210). If the first part is already created (by additive manufacturing "AM" or otherwise), the first part is placed in the bed 148 (step 220) and a second part (e.g., 20A) is manufactured using additive manufacturing (step 230) as described herein.

If the first part is to be additively manufactured (step 210), it is additively manufactured in bed 148 (step 240). To manufacture a second part of the hybrid core, one determines if the second part is using the same material (e.g., powder 101) as the first part (step 250). If the powder 101 is to be the same used as in the first part, the second part is additively manufactured on top of the first part in bed 148 (step 260). If the powder 101 is not to be the same as the first part, the powder 101 is changed (step 270) and the second part (e.g., 20A) is manufactured using additively manufacturing (step 280).

One exemplary method to manufacture the embodiment shown in FIG. 1, the ceramic portion 20A is imbedded in the bed 148 with its top 25 exposed. The powder 101 is one of the materials used to create an RMC portion 15A. The distribution tool 158 rolls a layer of powder 101 over the top 25 of the ceramic portion 20A to fill groove 30. The laser 160 then solidifies the powder 101. The distribution tool 158 then spreads the amount of powder 101 above the wall 140 across the wall 140 across the bed 148 augmenting its height and the laser then is activated to form another cross-section of RMC portion 15A until the part is completed.

One exemplary method to manufacture the embodiment shown in FIG. 2, the RMC portion 15B is imbedded in the bed 148 with its top 40 exposed. The powder 101 is one of the materials used to create a ceramic portion 20B. The distribution tool 158 rolls a layer of powder 101 over the top 40 of the RMC portion 15B. The laser 160 then solidifies the powder 101. The distribution tool 158 then spreads the amount of powder 101 above the wall 140 across the wall 140 across the bed 148 augmenting ceramic portion 20B's height and the laser then is activated to form another cross-section of ceramic portion 20B until the part is completed.

If the ceramic powder is difficult to sinter or melt, the ceramic powder may be mixed with a binder to form a slurry and "printed" or lased layer-by-layer and thermally post-processed to remove the binder and fired to sinter the ceramic powder together.

One exemplary method to manufacture the embodiment shown in FIG. 3, one of the RMC portion 15C is additively manufactured using powder 101 made of refractory material or the ceramic portion 20C is additively manufactured using powder 101 that is made of ceramic material or lased as above. That one is then placed in the bed 148 and the other of the RMC portion 15C is additively manufactured using powder 101 made of refractory material or the ceramic portion 20C is additively manufactured using powder 101 that is made of ceramic material as described hereinabove. The RMC portion 15C is additively manufactured using powder 101 made of refractory material and/or the ceramic portion 20C is additively manufactured using powder 101 that is made of ceramic material may be made in the same tool 130 or other tools.

One exemplary method to manufacture the embodiment shown in FIG. 4, the created piece either 20D or 80 is embedded in the bed 148 as described hereinabove and the other piece 15D/85 is additively manufactured thereto as described above.

Another exemplary method to make the embodiments shown in FIG. 1-4 is to make the ceramic portion and the RMC portion separately (at least one is additively made) and assembly together.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

I claim:

1. A method for manufacturing a hybrid core for turbine engine parts, comprising:
   providing a non-refractory metal portion;
   providing a refractory metal portion;
   manufacturing at least a portion of said non-refractory metal portion and at least a portion of said refractory metal portion by using an additive manufacturing process; and
   interfacing said non-refractory metal portion and said refractory metal portion with one another by using an additive manufacturing process.

2. The method of claim 1 further comprising:
   providing refractory metal powder; and
   manufacturing at least a portion of said refractory metal portion by fusing said refractory metal powder into a shape layer-by-layer.

3. The method of claim 2 further comprising:
   providing non-refractory metal powder; and
   manufacturing at least a portion of said non-refractory metal portion by fusing said non-refractory metal powder into a shape layer-by-layer.

4. The method of claim 3 further comprising:
   mixing said non-refractory metal powder with a binder.

5. The method of claim 1 further comprising:
   providing refractory metal powder;
   manufacturing at least a portion of said refractory metal portion by fusing said refractory metal powder into a shape layer by layer;
   providing non-refractory metal powder; and
   manufacturing at least a portion of said non-refractory metal portion by fusing said non-refractory metal powder into a shape layer by layer.

6. The method of claim 5 wherein said manufacturing steps are concurrent.

7. The method of claim 5 wherein said manufacturing steps are not concurrent.

8. The method of claim 1 further comprising:
   manufacturing one of said non-refractory metal portion and said refractory metal portion on top of another of said non-refractory metal portion and said refractory metal portion.

9. The method of claim 1 further comprising:
   manufacturing one of said a non-refractory metal portion and said refractory metal portion adjacent another of said non-refractory metal portion and said refractory metal portion.

10. The method of claim 1 wherein said non-refractory metal portion has a groove therein, and wherein a portion of said refractory metal portion is received in said groove.

11. The method of claim 1 wherein said non-refractory metal portion includes an extension projecting from a surface thereof, and wherein a portion of said refractory metal portion is additively manufactured on a surface of said extension.

12. The method of claim 1 wherein during said manufacturing step:
   a laser fuses powder particles to one another;
   powder is evenly distributed within a powder cavity by a distribution tool as layers of powder are fused together; and
   a piston positions a platform within the powder cavity as layers of powder are fused together, the fused powder particles supported on the platform.

\* \* \* \* \*